(12) United States Patent  
Kermet

(10) Patent No.: US 6,649,101 B2  
(45) Date of Patent: Nov. 18, 2003

(54) METHOD FOR USING A SPRUE TO REDUCE THE SIZE OF A CORE LAYER HOLE IN AN INJECTION MOLDING PROCESS BY TERMINATING AN INJECTION STREAM WITHIN THE SPRUE

(75) Inventor: John Kermet, Salem, MA (US)

(73) Assignee: Kortec, Inc., Beverly, MA (US)

( * ) Notice: Subject to any disclaimer, the term of this patent is extended or adjusted under 35 U.S.C. 154(b) by 0 days.

(21) Appl. No.: 09/919,270

(22) Filed: Jul. 31, 2001

(65) Prior Publication Data

US 2003/0026933 A1 Feb. 6, 2003

(51) Int. Cl.⁷ .............................................. B29C 45/16
(52) U.S. Cl. ..................... 264/161; 264/255; 264/328.8
(58) Field of Search ................................ 264/161, 255, 264/328.1, 328.8, 328.12, DIG. 57; 425/129.1, 130, 131.5, 133, 557, 562, 554

(56) References Cited

U.S. PATENT DOCUMENTS

| | | | | |
|---|---|---|---|---|
| 4,781,572 A | * | 11/1988 | Boring | 425/564 |
| 5,028,226 A | * | 7/1991 | De'ath et al. | 425/130 |
| 5,131,830 A | * | 7/1992 | Orimoto et al. | 425/130 |
| 5,510,065 A | | 4/1996 | McFarlane | |
| 5,914,138 A | | 6/1999 | Swenson | 425/130 |
| 6,159,000 A | * | 12/2000 | Puri et al. | 425/562 |
| 6,187,241 B1 | | 2/2001 | Swenson | 264/255 |

OTHER PUBLICATIONS

International Search Report of Dec. 12, 2002.

* cited by examiner

*Primary Examiner*—Angela Ortiz
(74) *Attorney, Agent, or Firm*—Duane Morris LLP

(57) ABSTRACT

A method and apparatus for extruding plastic articles, the method comprising the steps of injecting at least one stream of plastic material into a mold, the mold including a first portion and a second portion, the first portion of said mold being used for forming at least one article, and the second portion of said article forming a sprue attached to the at least one article, and, terminating the at least one stream of plastic material in the second portion.

19 Claims, 12 Drawing Sheets

METHOD FOR USING A SPRUE TO REDUCE THE SIZE OF A CORE LAYER HOLE IN AN INJECTION MOLDING PROCESS BY TERMINATING AN INJECTION STREAM WITHIN THE SPRUE

FIELD OF THE INVENTION

This invention relates to an injection molding process, and in particular, a method and apparatus for reducing the size of a core layer hole in an injection molding process.

BACKGROUND OF THE INVENTION

Presently, many plastic articles are formed by injection molding processes. These articles include common items such as test tubes and pre-forms for forming items such as beer and ketchup bottles. Many of these articles are produced from injection molding machines having the ability to inject multiple plastic layers at the same time (i.e., co-injection). Thus, the injection-molded articles may have two or more layers of plastic in their final form (i.e., multi-layer plastic articles).

A common configuration of multi-layer plastic articles includes an interior or "core" plastic layer which is surrounded on all sides by an outer plastic layer. For example, see U.S. Pat. Nos. 5,914,138 and 6,187,241, both assigned to Kortec, Inc. The disclosures of both of these patents are incorporated herein by reference. Typically, the interior (core) layer is formed of a material such as Ethyl Vinyl Alcohol (EVOH), and the outer layer is formed from a material such as Polyethylene Terephtholate (PET). This construction produces a sandwich structure wherein the outer layer (e.g., PET) forms both the exterior and the interior of the article, and the interior (core) layer (e.g., EVOH) is sandwiched therebetween.

However, a common problem experienced when injection molding such articles is that a hole or gap is formed in the interior (core) layer at the base of the molded article where the interior (core) layer enters the mold. The hole is formed because the interior (core) is formed by an annular stream with a diameter that decreases towards the base of the molded article. The diameter of the annular core stream at the base of the article corresponds directly to the diameter of the hole or gap. In particular, the interior (core) layer enters the mold as an annular stream which is surrounded on both sides by inner and outer covering layers. When the flow of the interior (core) layer is stopped, a tail of the interior (core) layer continues up the sidewall of the molded part, thereby creating a hole at the base of the molded part which is typically much larger than a gate of the nozzle which injects the interior (core) and outer layers.

FIG. 14 shows a conventional injection molding system 500 which includes injection molding apparatus 510 and a mold 550. The injection molding apparatus 510 includes a nozzle 515 which has various passageways for transferring plastic materials to the mold 550. A first series of passageways 520 are used for delivering plastic material 521 to the mold 550. Plastic material 521 forms both an inner covering layer (IL) and an outer covering layer (OL). A second series of passageways 525 are used for delivering an interior annular layer (IA) of plastic material 526 to the mold 550. The interior annular layer IA may be, for example, a barrier layer that prevents passage of gases into or out of the molded article. The first and second series of passageways 520, 525 come together at a gate portion 530 of the nozzle 515. The nozzle gate portion 530 comprises a relatively narrow portion of the nozzle 515 which feeds directly into the mold 550. The injection molding apparatus 510 also includes a throttle pin 535 for controlling the flow of plastic material (521, 526) through the nozzle gate portion 530.

Particularly, if the interior (core) layer IA is stopped too soon, the interior (core) layer IA will travel up the sidewall of the molded part, thereby creating a large hole or gap 595 at the base of the part. If the interior (core) layer IA is stopped too late, some interior (core) material IA will be left in the nozzle 530 of the injection molding apparatus 510. This remaining material will contaminate the next molding by flowing into the next molded part and possibly ending up on an outside wall of the part. The result of this type of contamination is often referred to as 'scale.' Scale can occur inside and/or outside of the molded part.

Controlling the size of the hole or gap created by the annular interior (core) streams is fundamental in present day injection molding systems. If this gap is too large, the barrier properties of the molded part will be significantly reduced. In other words, a vacuum created within a substance-containing portion of the part cannot be maintained for a long period of time because exterior gases will enter the part through the hole, or conversely pressure can not be maintained in the part because gases within the molded part will seep out through the hole.

Thus, there is presently a need for a method and apparatus for injection molding articles where the size of a gap or hole in the interior plastic layer is efficiently controlled.

SUMMARY OF THE INVENTION

The present invention is a method and apparatus for extruding plastic articles, the method comprising the steps of injecting at least one stream of plastic material into a mold, the mold including a first portion and a second portion, the first portion of said mold being used for forming at least one article, and the second portion of said mold forming a sprue attached to the at least one article, and, terminating the at least one stream of plastic material in the second portion.

The above and other advantages and features of the present invention will be better understood from the following detailed description of the exemplary embodiments of the invention which is provided in connection with the accompanying drawings.

BREIF DESCRIPTION OF THE DRAWINGS

DETAILED DESCRIPTION

Figure 1:
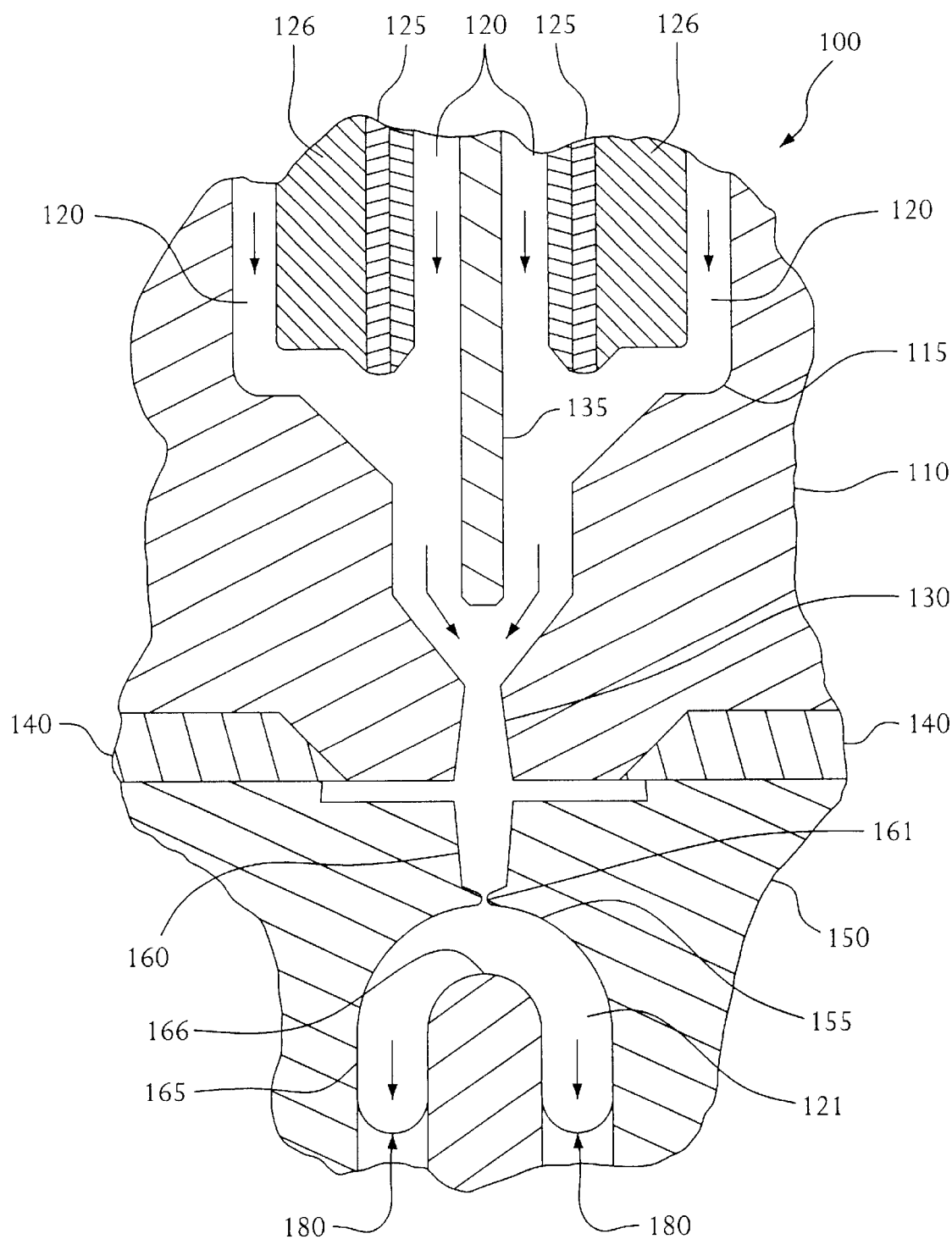
FIG. 1 is a cross sectional view of an injection molding system according to a first exemplary embodiment of the present invention during a first stage of a fill sequence.

FIG. 1 shows a cross section of an injection molding system 100 according to a first exemplary embodiment of the present invention, including an injection molding apparatus 110 and a mold 150. The injection molding apparatus 110 includes a nozzle 115 which has various passageways for transferring plastic materials to the mold 150. A first series of passageways 120 are used for delivering plastic material 121 to the mold 150. Plastic material 121 forms both an inner covering layer (IL) and an outer covering layer (OL) (See FIG. 2). A second series of passageways 125 are used for delivering an interior annular layer (IA) of plastic material 126 to the mold 150. The interior annular layer IA may be, for example, a barrier layer that prevents passage of gases into or out of the molded article. The first and second series of passageways 120, 125 come together at a gate portion 130 of the nozzle 115. The nozzle gate portion 130 comprises a relatively narrow portion of the nozzle 115 which feeds directly into the mold 150. The injection molding apparatus 110 also includes a throttle pin 135 for controlling the flow of plastic material (121, 126) through the nozzle gate portion 130.

The mold 150 includes a mold cavity 155 with a first portion 160 and a second portion 165. As will be understood from the foregoing description, the first portion 160 of the mold cavity 155 comprises a sprue portion, and the second portion 165 comprises a molded article portion. Disposed between the injection mold apparatus 110 and the mold 150, there is an ejector member 140 used for separating a sprue 220 (See FIG. 5) formed by the first portion 160 of the mold 150 from the injection molding apparatus 110 (See FIGS. 8 and 9). The sprue portion 160 includes a sprue gate 161 at an end thereof which serves as an injection point for plastic material (121, 126) into the mold cavity 155.

Figure 5:
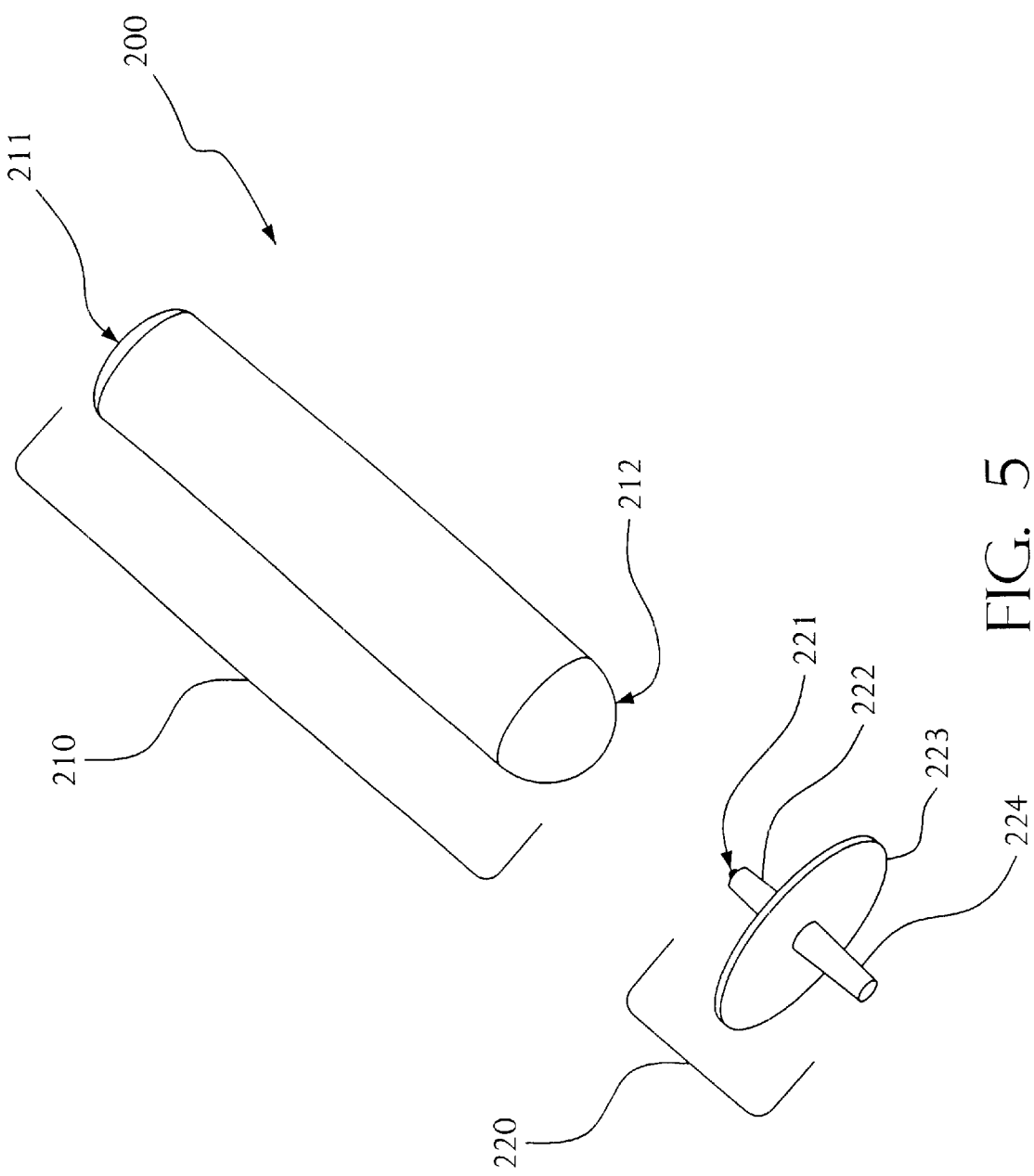
FIG. 5 is an isometric view of the molded article of FIG. 4 with the sprue portion removed.

The sprue portion 160 of the mold cavity 155 contains the sprue 220, which forms no part of a final molded article 210 formed by the mold 150 (See FIG. 5). The sprue portion 220 is merely an additional portion which is used to assist in controlling the flow of plastic materials 121, 126 into the mold 150, but which may be discarded after the molded article 210 has been produced (as explained below).

FIG. 1 shows a first exemplary embodiment of an injection molding system 100 according to the present invention during a first stage of a fill process for filling the mold 150 with plastic material (121, 126). As shown in FIG. 1, a first plastic material 121, such as PET or Polypropylene (PP), which forms the inner and outer covering layers IL, OL of the molded article travels through passageways 120 of the nozzle 115, passes through the gate portion 130 of the nozzle, and is passed to the mold 150. It will be noted that the passageways 120 of the injection molding system 100 are annular, thereby creating annular streams of the first material 121. The advantages of using annular flow are explained in U.S. Pat. No. 6,187,241 referenced above. These annular streams come together at the nozzle gate portion 130 to form a circular stream, until they are injected into the molded article portion 165 of the mold 150 (through sprue gate 161) where the streams again flow in an annular fashion. In the exemplary embodiment shown in FIG. 1, the flow of the material 121 is initiated before the flow of the material 126. The material 121 forming the layers OL and IL flows through the sprue portion 160 of the mold cavity 155, and into the molded article portion 165. A flow front 180 of the material 121 is shown in FIG. 1.

Figure 2:
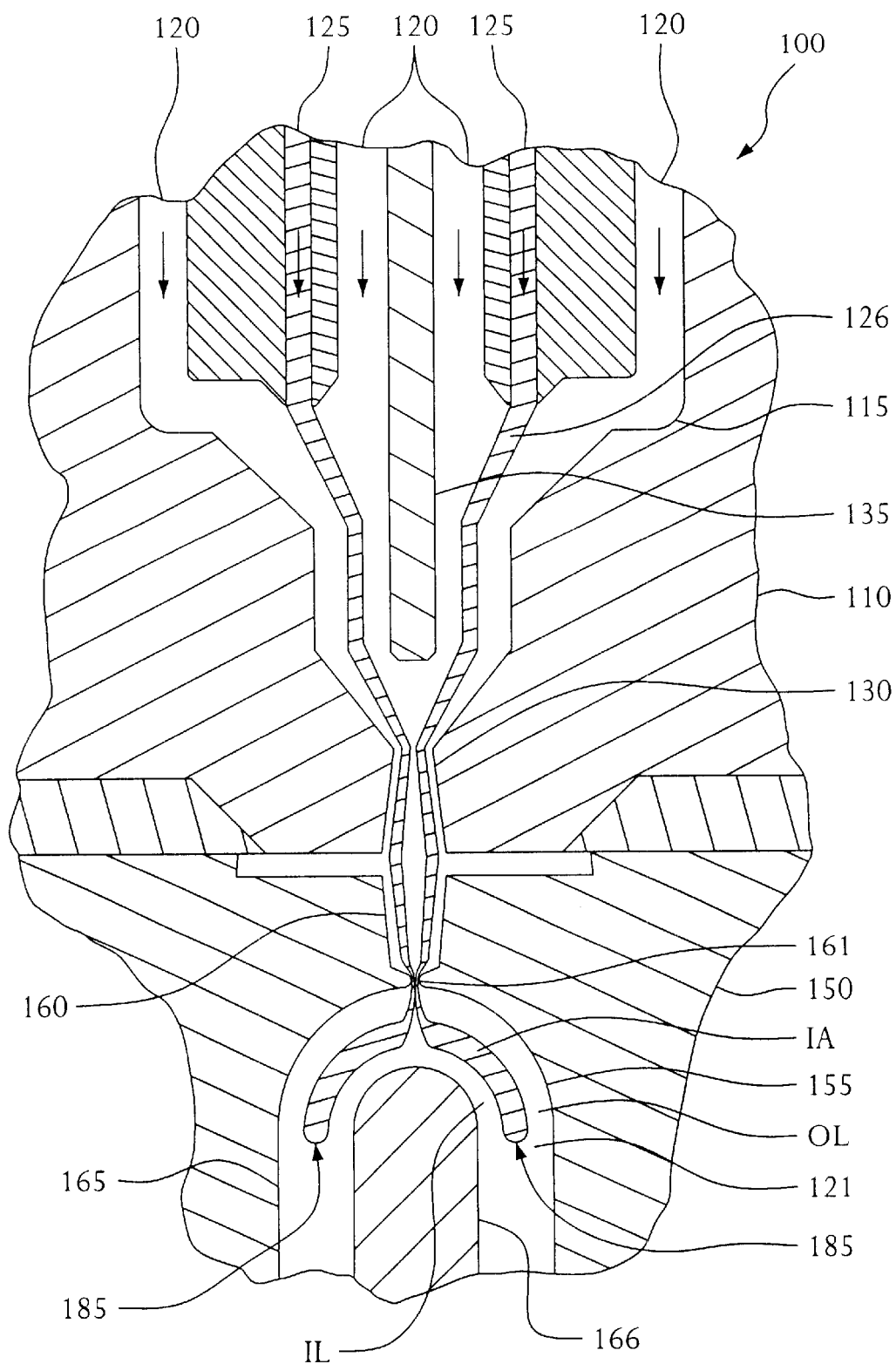
FIG. 2 is a cross sectional view of the injection molding system of FIG. 1 during a second stage of a fill sequence.

FIG. 2 shows the injection molding system 100 of FIG. 1 during a second stage of the fill process. In the second stage, the flow of IA material 126, such as EVOH has been initiated. The IA material 126 flows from the passageways 125 of the nozzle 115, through the nozzle gate portion 130, through the sprue portion 160 of the mold cavity 155, and into the molded article portion 165 of the mold cavity. It will be noted that passageways 125 of the injection molding system 100 are annular, thereby creating an annular stream of the IA material 126. This annular stream remains annular through the nozzle gate 130 and into the mold 150. A leading edge 185 of the IA material 126 is shown in FIG. 2.

The IA material 126 flows through the approximate center of the material 121 already flowing in the mold 150, thereby creating an IL stream and an OL stream from the single stream of plastic material 121. In the exemplary embodiment of the present invention, the ratio of the IL stream to the OL stream is 50:50, however, it will be understood by those skilled in the art that this ratio can be varied (e.g., 25:75, 75:25, etc.).

Figure 3:
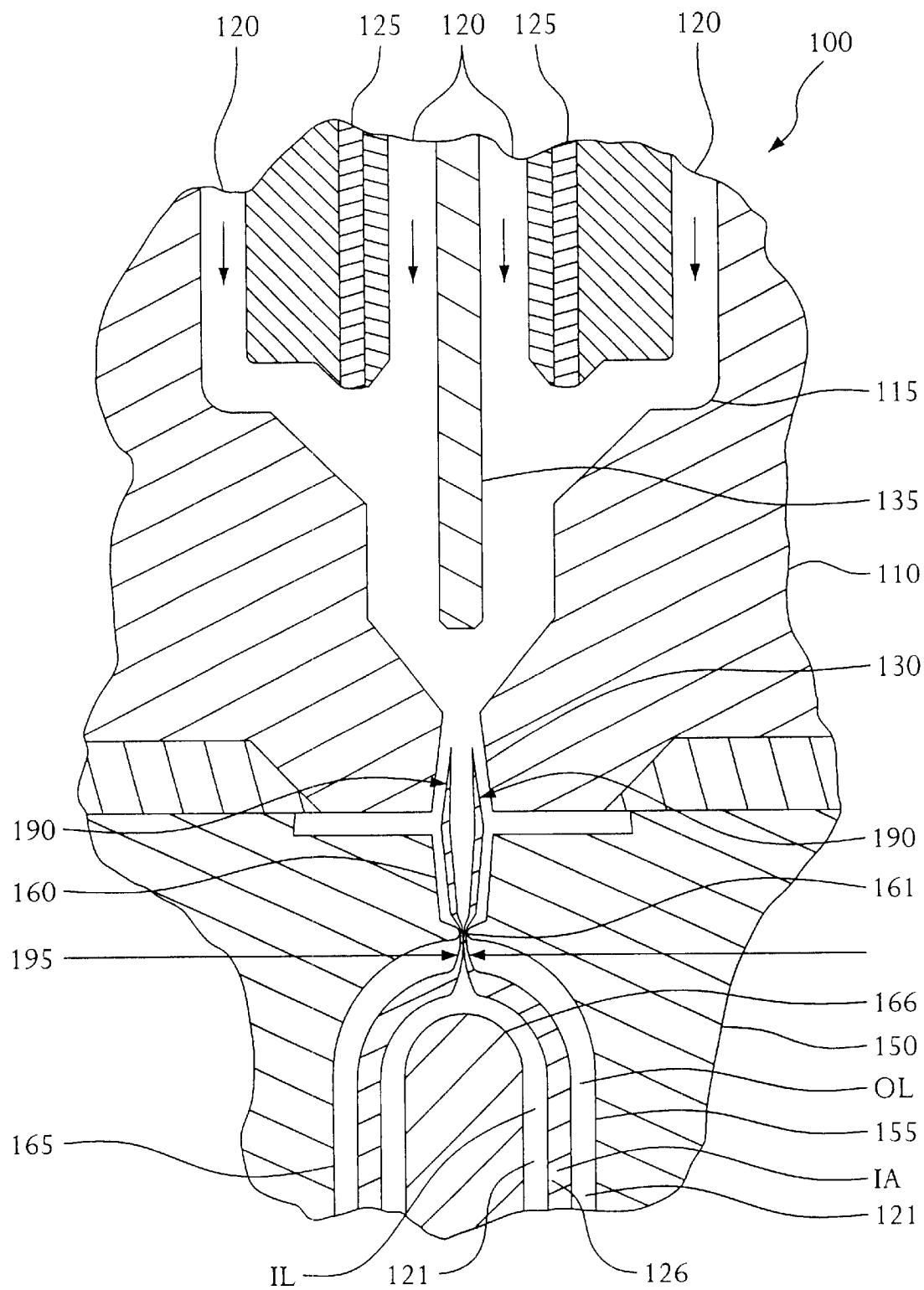
FIG. 3 is a cross sectional view of the injection molding system of FIG. 1 during a third stage of a fill sequence.

FIG. 3 shows the injection molding system 100 of the present invention during a third (and final) stage of the fill process. In the third stage, the flow of material 126 is terminated, such that a trailing edge 190 of the core material is at least partially disposed within the sprue portion 160 of the mold cavity 155. It will be noted that, due to the annular nature of the IA stream, a gap 195 is created in the interior layer at the base of the molded article. The IL, OL stream is initiated before the initiation of the IA stream, and is terminated after the termination of the IA stream. The IL, OL layer must continue flowing until the IA layer is pushed out of the nozzle, thereby cleaning the nozzle of the IA stream.

This feature of terminating the interior (core) material 126 within the sprue portion 160 overcomes a problem of the prior art of trying to precisely control termination of the core material. Because the termination occurs before the beginning of the molded article 210 in the present invention, there is little or no risk of the hole 195 in the core layer being too large. Further, because the core material termination is clearly beyond the nozzle gate 130 of the nozzle 115, there is little or no risk of contamination and scaling in the next molded article produced. The sprue portion 160 of the mold 150 provides a long zone of tolerance within which the core material can be terminated without impacting the quality of the finished part, or contamination of the nozzle.

Figure 14:
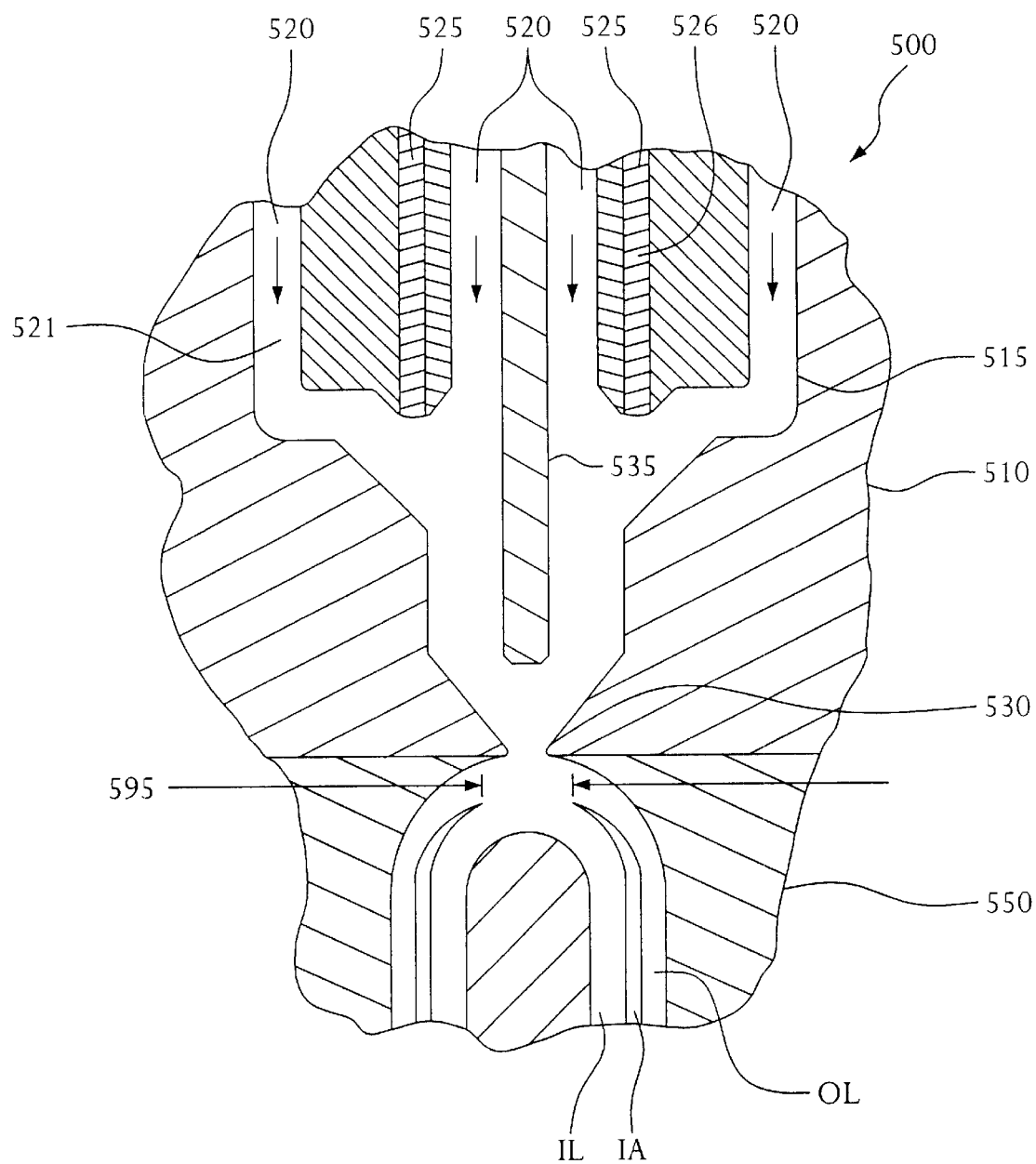
FIG. 14 is a cross sectional view of a conventional injection molding system.

As seen in FIG. 3, a gap or hole 195 in the interior annular layer IA exists near the base of the molded article (i.e., the upper portion of the mold 150) which is approximately equal to the inner diameter of the annular stream of IA material 126. Due to the configuration of the sprue portion 160 of the mold cavity 155, and due in part to the ratio of IL to OL, this gap 195 has a diameter which is approximately 50% of the diameter of the sprue gate 161 (as opposed to conventional injection molding apparatus where this gap 595 is much larger than the diameter of the gate 530; See FIG. 14) in the first exemplary embodiment. Moreover, the configuration of the sprue portion 160 of the mold cavity 155 allows the size of the gap 195 to be controlled reliably. Preferably, the sprue portion 160 of the mold cavity 155 is shaped in such a way that the gap 195 is in a range approximately 40–60% of the diameter of the sprue gate 161 in the exemplary embodiment. By decreasing the size of this gap 195, the barrier properties of the molded article are comparatively increased. In other words, the molded article will be able to retain gases stored therein for longer periods, and will be able to prevent the entry of exterior gases for longer periods. In the foregoing description, reference will be made to the "protected" and "unprotected" portions of the molded part. The "unprotected" portion comprises that portion of the molded part which fails to include an interior annular layer IA (i.e., the portion of the part where the gap 195 exists). The "protected" portion comprises that portion of the molded part which includes an interior annular layer IA (i.e., the remainder of the part).

For a typical tube shaped part with a length L of approximately 75 mm and a diameter D of approximately 12 mm, the total surface area SA of the tube shaped part may be expressed as follows:

$$SA(part)=SA(tube)+SA(spherical\ end)$$

$$SA(tube)=(L-D/2)*(\pi)*D=2601\ mm^2$$

$$SA(spherical\ end)=(D^2/4)*(\pi)=113\ mm^2$$

$$Thus,\ SA(part)=2714\ mm^2$$

Without running the interior annular layer IA through the sprue portion 160 and through sprue gate 161, the unprotected gap diameter might vary between 2.0–5.0 mm. Additionally, the surface area of the gap may be expressed as:

$$SA(gap)=(\pi)*D^2/4$$

Accordingly, a gap with a diameter in the above range will have a surface area between 3.14 mm² and 19.6 mm². Then, the ratio of unprotected area to protected area is in the range from 1:864 to 1:138. At this ratio, the gap could play a significant role in determining the total barrier performance of the part.

Running the interior annular layer IA through the sprue portion 160 and through the sprue gate 161 will create a significantly smaller gap 195. For a typical sprue gate 161 diameter of 0.8 mm, a ratio of IL to OL of 50:50, and a typical polymer material, the gap diameter will be about 0.4 mm. The area of the hole in the protective interior annular layer IA will be:

$$SA(gap)=D^2/4*(\pi)\ 0.126\ mm^2$$

When using the sprue portion 160, the ratio of unprotected area to protected area is about 1:20,000. This ratio shows that the unprotected gap 195 will have a negligible effect on the total barrier properties of the part. The gap surface area has also been significantly reduced by a factor of between 23.1 and 145.

The ratio of the thickness of the IL, OL layers also has an effect on the size of the gap 195 in the interior annular layer IA. In the exemplary embodiment described above, the ratio is 50:50 (i.e., the IL and OL layers are divided evenly on each side of the IA layer). However, if the ratio of IL to OL were about 25:75, then a gap 195 which is in a range of approximately 25–50% of the diameter of the sprue gate 161 is achievable. Moreover, if the ratio of IL to OL were about 75:25, then a gap 195 which is in a range of approximately 50–75% of the diameter of the sprue gate 161 is achievable. The actual gap diameter can be calculated by those skilled in the art based on the flow properties of the particular materials and the ratio of flow rates of IL to OL.

Figure 4:
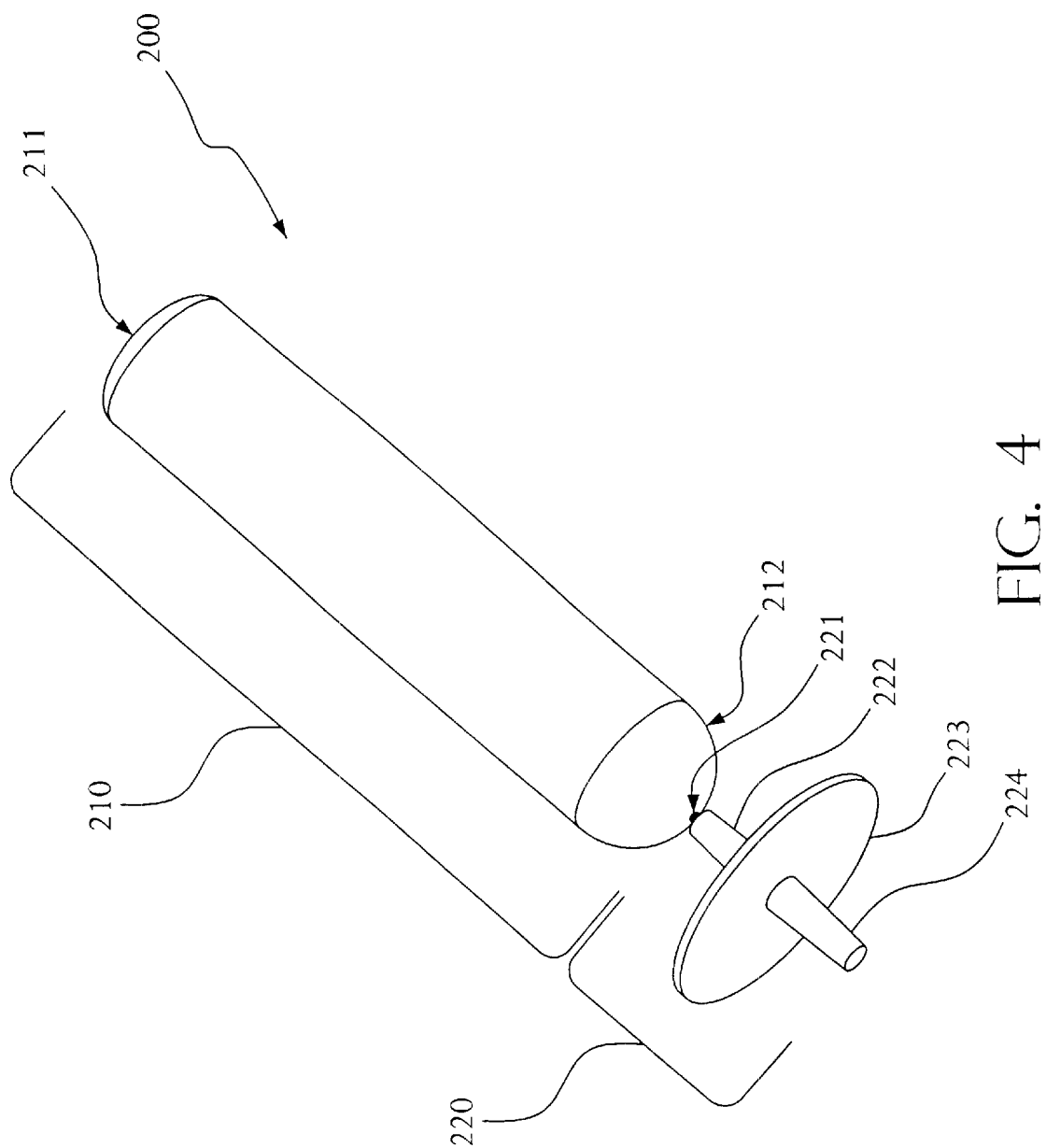
FIG. 4 is an isometric view of a molded article formed using the injection molding system according to the first exemplary embodiment of the present invention.

The above-described injection molding apparatus 100 forms a molded article 200, as shown in FIG. 4. The molded article 200 comprises an article portion 210, and a sprue portion 220. Although the molded article 210 may be of any desired shape (depending upon the shape of the mold 150), the molded article shown in FIG. 4 comprises a test tube for retaining blood with a first end 211 (which is typically open to receive blood), and a second end 212 (which is typically closed).

A thin gate member 221 attaches the sprue portion 220 of the molded article 200 to the article portion 210. The gate member 221 is coupled to a first shaft 222 of the sprue portion 220, which is in turn connected to a disk 223 of the sprue portion. The disk 223 of the sprue portion 220 is connected to a second shaft 224 of the sprue portion.

The gate member 221 is coupled to the article 210 and the sprue 220 in such a way that, if sufficient force is exerted on the article in a direction away from the sprue, the article will separate from the sprue, as shown in FIG. 5. This separation of the article 210 and the sprue 220 provides an article which is ready for use, and a sprue part which may be discarded.

Figure 7:
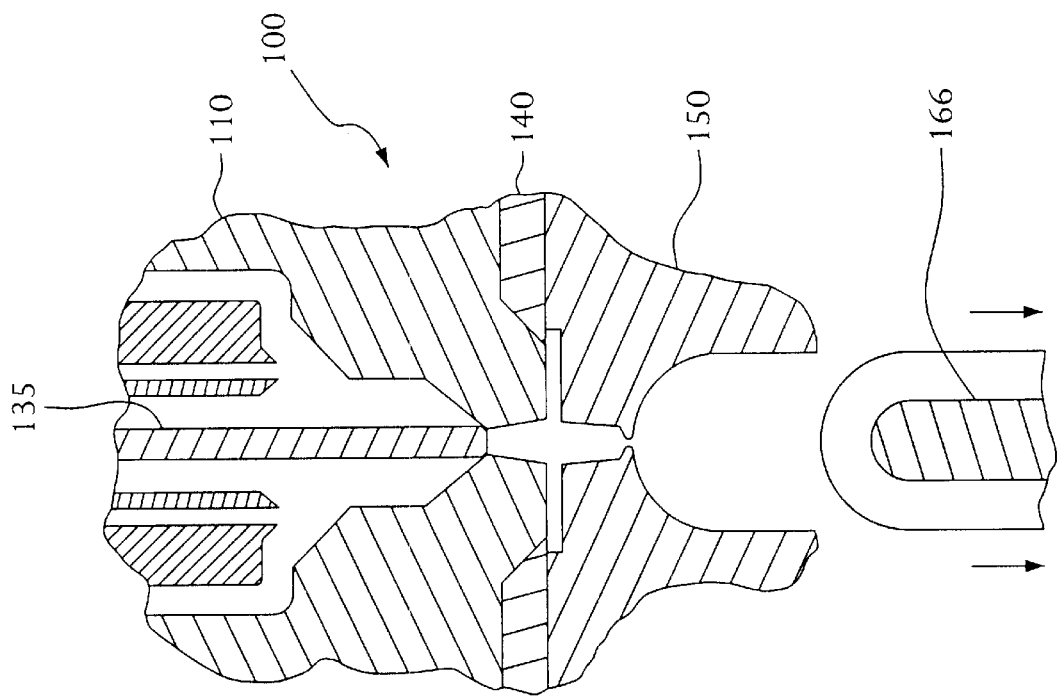
FIG. 7 is a cross sectional view of the injection molding system of FIG. 6 during a second stage of an ejection sequence.
Figure 6:
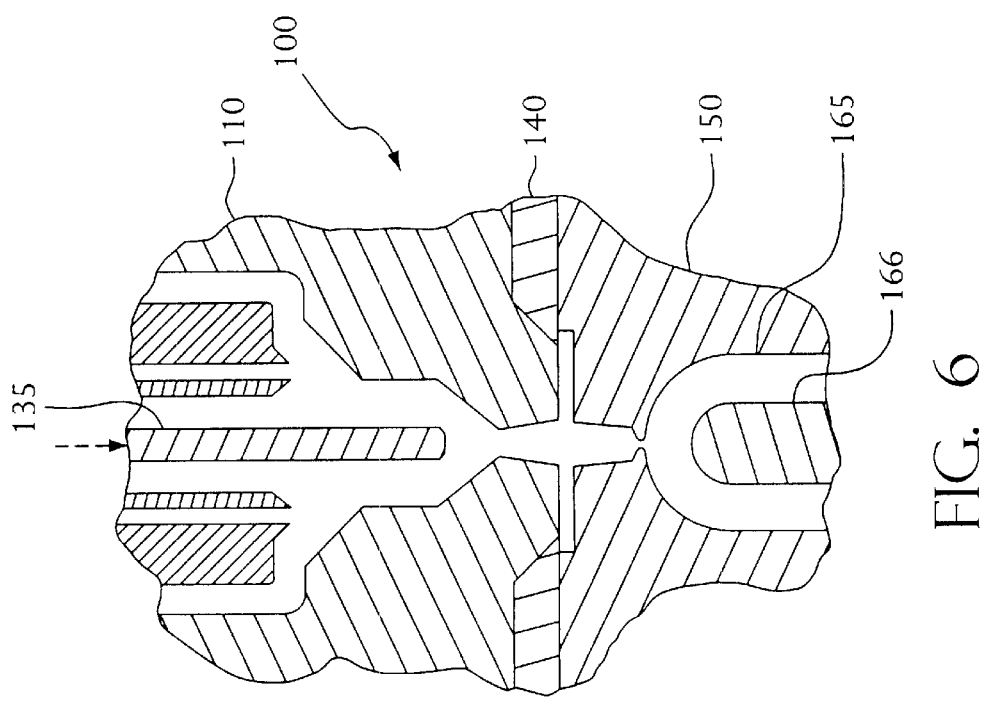
FIG. 6 is a cross sectional view of the injection molding system according to a first exemplary embodiment of the present invention during a first stage of an ejection sequence.

FIGS. 6–9 show an exemplary ejection process for removing the molded article 200 from the mold 150 once the article has been molded. FIG. 6 shows a first step in the ejection process where the throttle pin 135 is moved towards the gate portion 130 of the injection molding apparatus 110. In FIG. 7, once the throttle pin 135 completely occupies the gate portion 130, thus cutting off any residual plastic in the nozzle 115 from the mold 150. A mandrel portion 166 of the mold 150 is moved way from the injection molding apparatus 110 in the direction indicated by the arrows. The movement of the mandrel portion 166 of the mold 150 away from the injection molding apparatus 110 creates sufficient force to break the thin member 221 which connects the article 210 (carried on the molded article portion of the mold) to the sprue 220.

Figure 9:
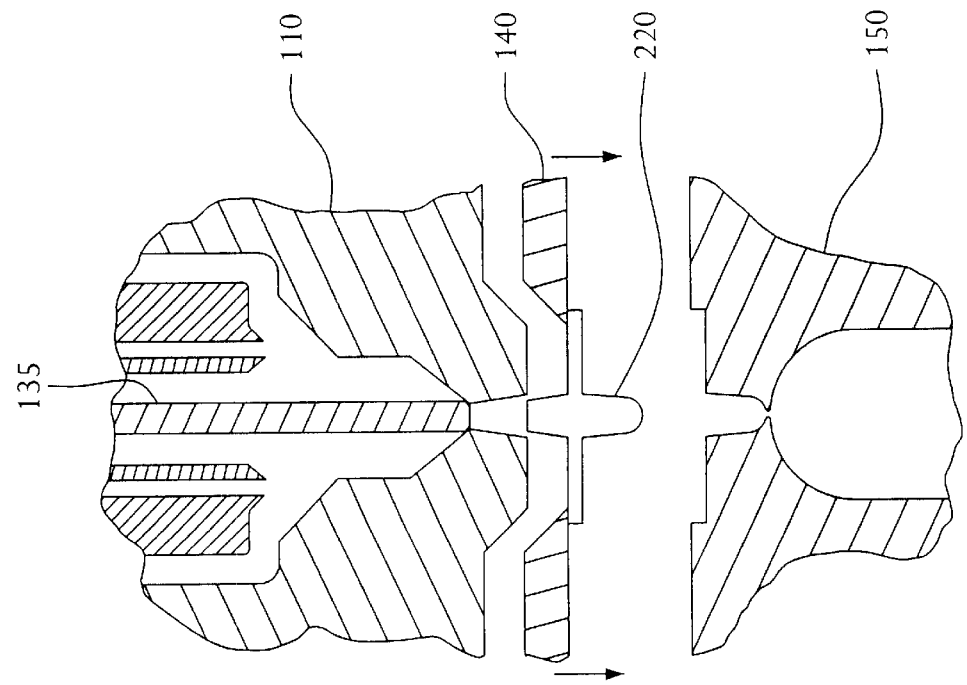
FIG. 9 is a cross sectional view of the injection molding system of FIG. 6 during a fourth stage of an ejection sequence.
Figure 8:
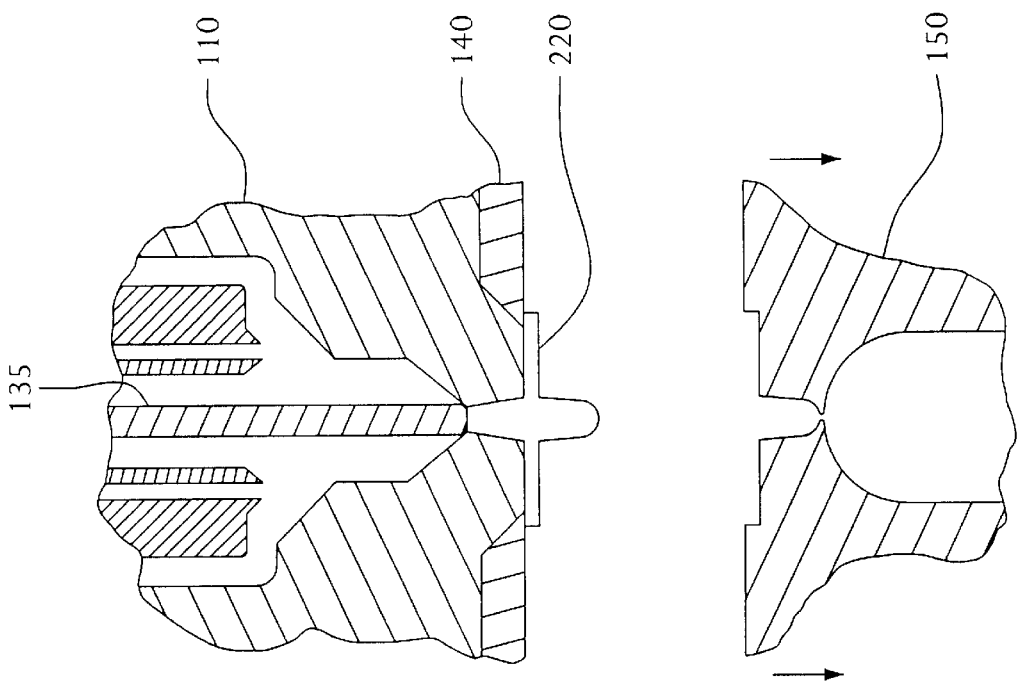
FIG. 8 is a cross sectional view of the injection molding system of FIG. 6 during a third stage of an ejection sequence.

FIG. 8 shows a third step in the ejection process where the sprue portion 160 of the mold 150 is moved away from the injection molding apparatus 110. This action leaves the sprue 220 attached to the injection molding apparatus 110. In FIG. 9, to remove the sprue 220 from the injection molding apparatus 110, an ejector member 140 is moved away from the injection molding apparatus, thereby creating sufficient force to remove the sprue.

Figure 10:
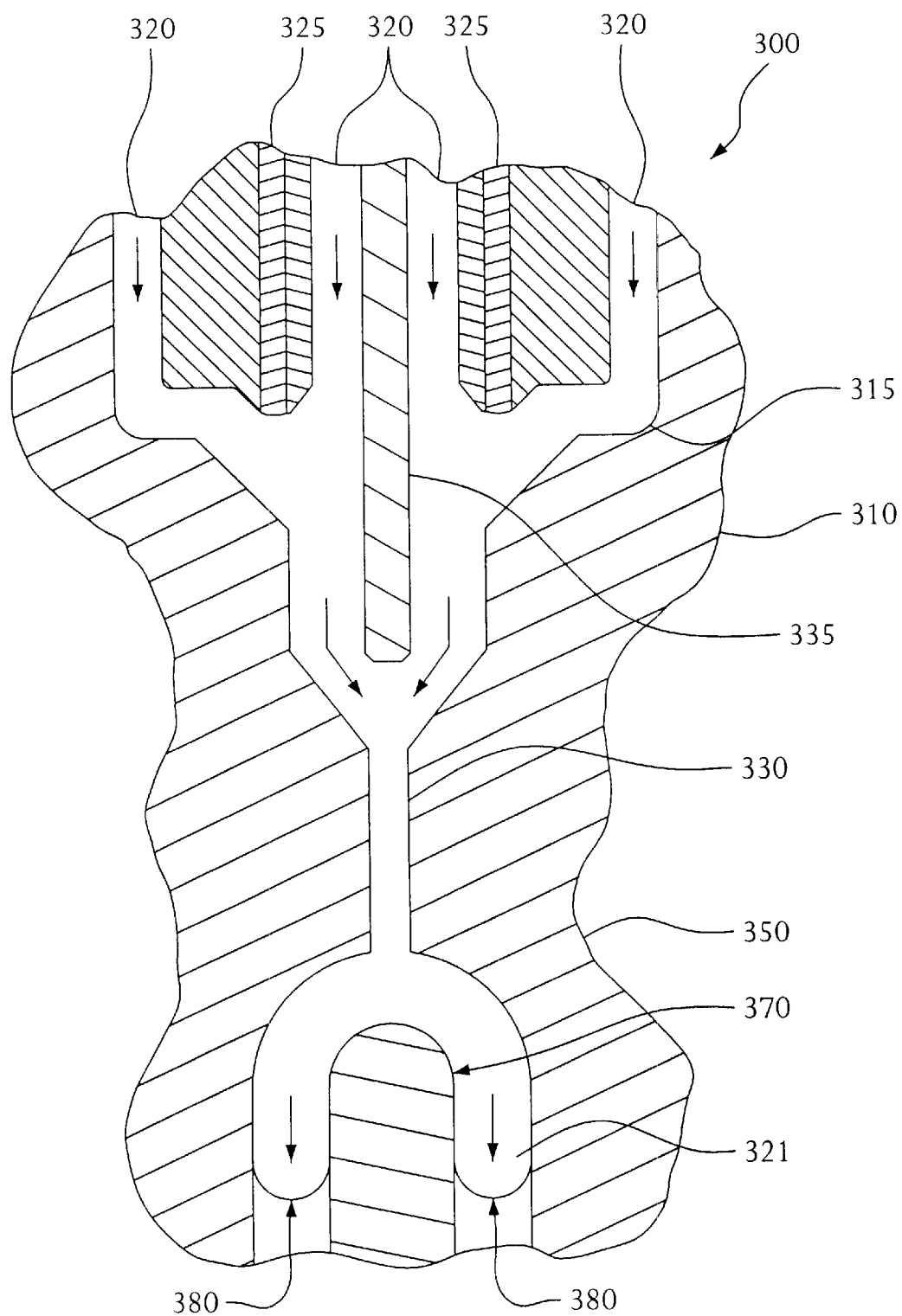
FIG. 10 is a cross sectional view of an injection molding system according to a second exemplary embodiment of the present invention during a first stage of a fill sequence.

Referring to FIG. 10, there is shown a cross section of an injection molding system 300 according to a second exemplary embodiment of the present invention. The injection molding system includes an injection molding apparatus 310 and a mold 350. The injection molding apparatus 310 includes a nozzle 315 which has various passageways for transferring plastic materials to the mold 350. A first series of passageways 320 are used for delivering an inner covering layer (IL) and an outer covering layer (OL) of plastic material 321 to the mold 350 (See FIG. 11). A second series of passageways 325 are used for delivering an interior annular layer (IA) of plastic material 326 to the mold 350. The first and second series of passageways 320, 325 come together at a gate portion 330 of the nozzle 315. The gate portion 330 comprises a relatively narrow portion of the nozzle 315 which feeds directly into the mold 350. The injection molding apparatus 310 also includes a throttle pin 335 for controlling the flow of plastic material (321, 326) through the gate portion 330 of the nozzle 315.

In the second exemplary embodiment, the gate portion 330 forms both a 'nozzle' gate and a 'sprue' gate (i.e., there is no separate sprue portion of the mold as in the first exemplary embodiment).

FIG. 10 shows the injection molding system 300 during a first stage of a fill process for filling the mold 350 with plastic material (321, 326). As shown in FIG. 10, a first plastic material 321, such as PET or PP, which forms the inner and outer covering layers IL, OL) of the molded article travels through passageways 320 of the nozzle 315, passes through the gate portion 330 of the nozzle, and is passed to the mold 350. It will be noted that the passageways 320 of the injection molding system 100 are annular, thereby creating annular streams of the first material 321. These annular streams come together at the gate portion 330 to form a single non-annular stream, until they are injected into the molded article portion 365 of the mold 350 where the streams again flow in an annular fashion. A flow front 380 of the material 321 is shown in FIG. 10.

Figure 11:
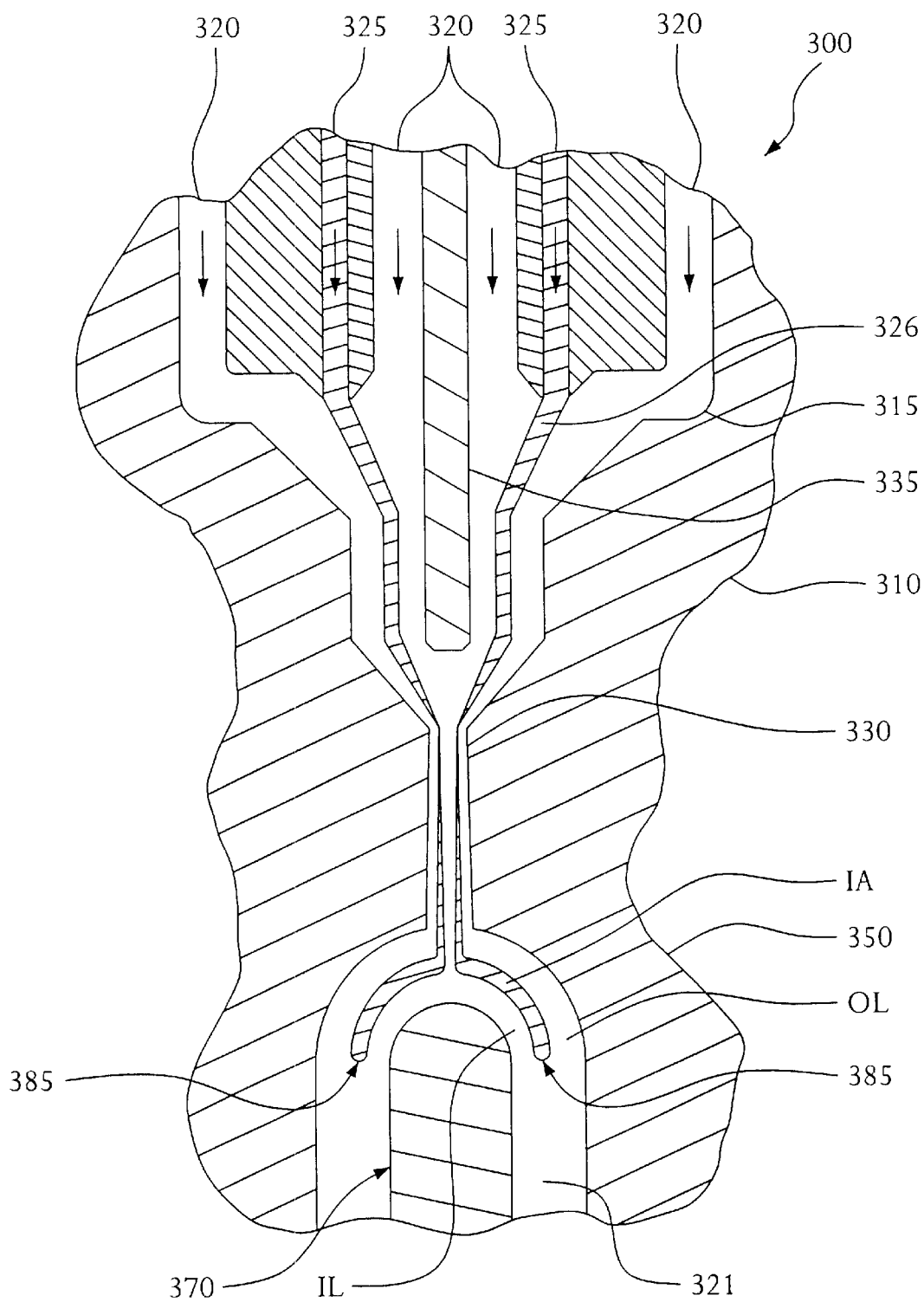
FIG. 11 is a cross sectional view of the injection molding system of FIG. 10 during a second stage of a fill sequence.

FIG. 11 shows the injection molding system 300 during a second stage of the fill process. In the second stage, the flow of IA material 326, such as EVOH has been initiated. The IA material 326 flows from the passageways 325 of the nozzle 315, through the gate portion 330, and into the mold 350. It will be noted that passageways 325 of the injection molding system 300 are annular, thereby creating an annular stream of the IA material 326. This annular stream remains annular through the gate 330 and into the mold 350. A leading edge 385 of the IA material 326 is shown in FIG. 11.

Figure 12:
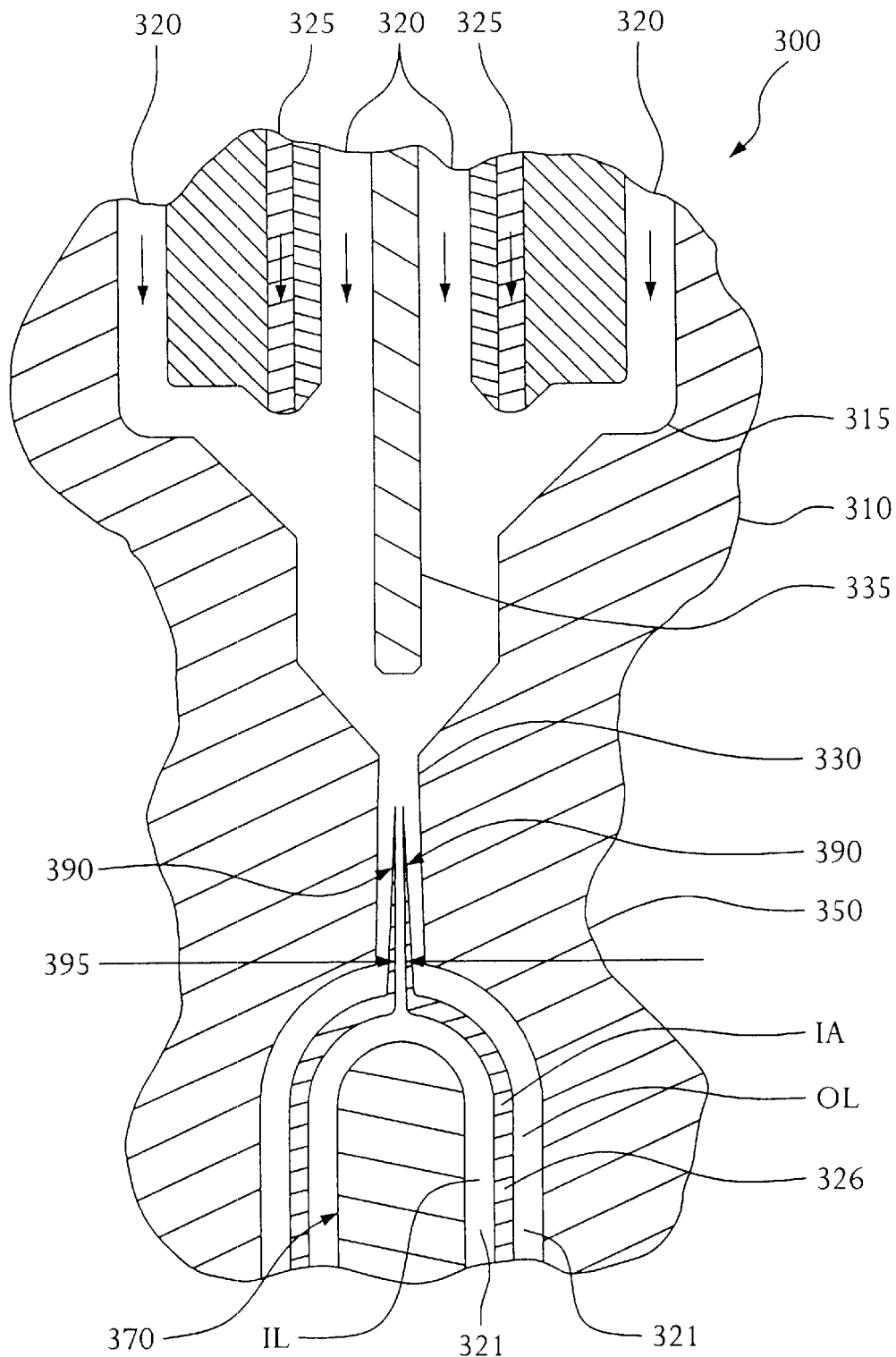
FIG. 12 is a cross sectional view of the injection molding system of FIG. 10 during a third stage of a fill sequence.

FIG. 12 shows the injection molding system 300 of the present invention during a third (and final) stage of the fill process. In the third stage, the flow of IA material 326 is terminated. A trailing edge 390 of the IA material 326 is shown in FIG. 12.

As will be seen in FIG. 12, a gap or hole 395 in the interior annular layer IA exists near the base of the molded article (i.e., the upper portion of the mold 350) which is approximately equal to the inner diameter of the annular stream of IA material 326.

Due to the long and narrow structure of the gate portion 330, this gap 395 has a diameter which is approximately 50% of the diameter of the gate 330 (as opposed to conventional injection molding apparatus 500 where this gap 595 is much larger than the diameter of the gate 530; See FIG. 14) in the exemplary embodiment. Preferably, the gate portion 330 is formed in such a way that the gap 395 is approximately 40–60% of the diameter of the gate 330 in the exemplary embodiment. By decreasing the size of this gap 395, the barrier properties of the molded article are comparatively increased. In other words, the molded article will be able to retain gases stored therein for longer periods, and will be able to prevent the entry of exterior gases for longer periods.

As discussed above with reference to the first exemplary embodiment, the ratio of IL, OL layers also has an effect on the size of the gap 395 in the interior annular layer IA. In the exemplary embodiment described above, the ratio is 50:50 (i.e., the IL and OL layers are divided evenly on each side of the IA layer). However, if the ratio of IL to OL were about 25:75, then a gap 395 which is in a range of approximately 25–50% of the diameter of the gate is achievable. Moreover, if the ratio of IL to OL were about 75:25, then a gap 395 which is in a range of approximately 50–75% of the diameter of the gate is achievable. The above equations dictate the relationship between the IL:OL ratio and the gap size.

Figure 13:
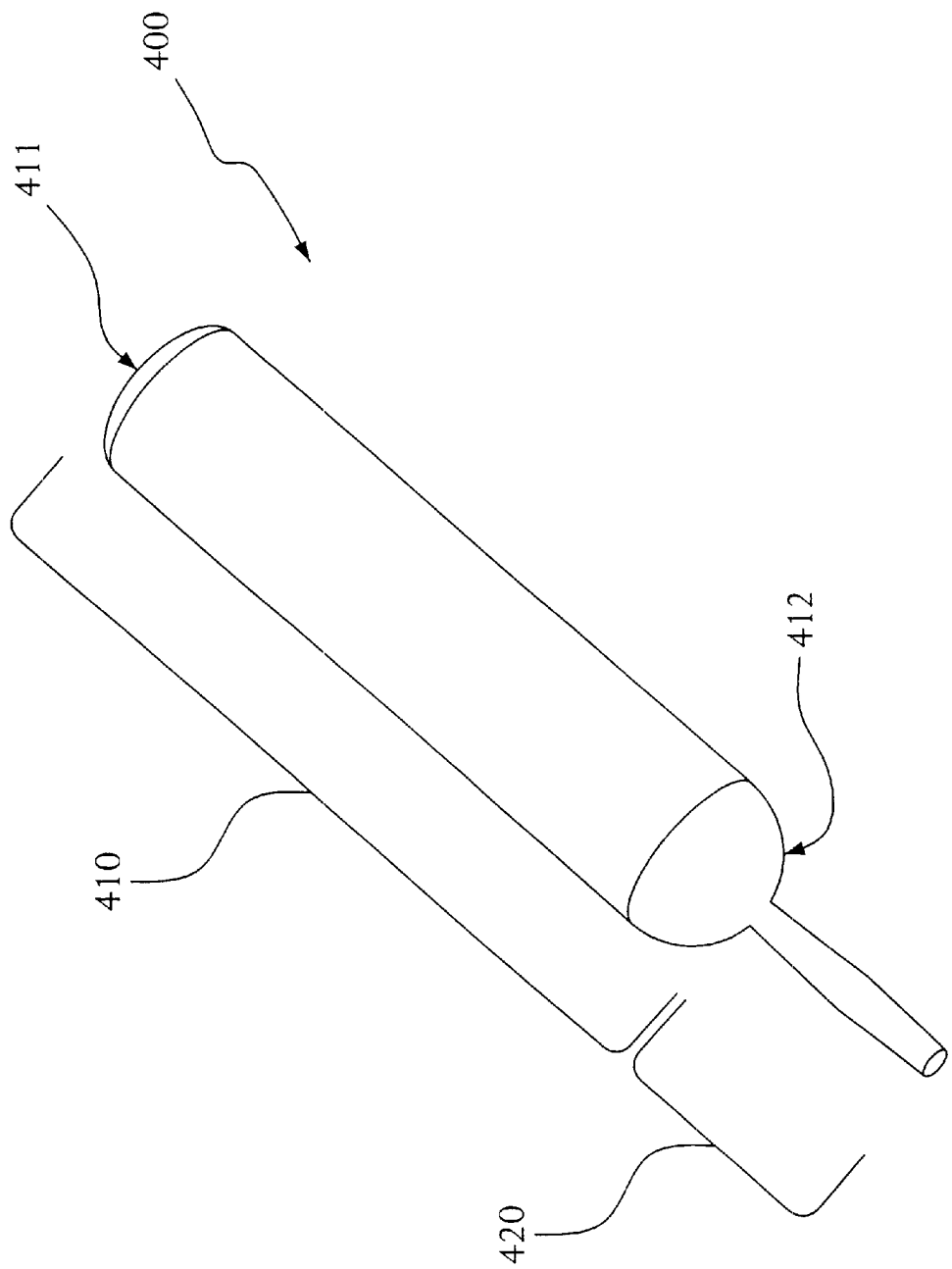
FIG. 13 is an isometric view of a molded article formed using the injection molding system of the second exemplary embodiment.

FIG. 13 shows a molded article 400 formed using the injection molding system 300 according to the second exemplary embodiment of the present invention. The molded article 400 comprises an article portion 410, and an unwanted portion 420. When the unwanted portion 420 is removed from the article portion 410 (by cleaving or some equivalent process), the molded article appears much as the article 210 in FIG. 4.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A method for extruding plastic articles comprising the steps of:

injecting at least one stream of plastic material into a mold, said mold including a first portion and a second portion, said first portion of said mold being used for forming at least one article, and said second portion of said mold forming a sprue attached to the at least one article; and terminating the at least one stream of plastic material in said second portion of the mold, wherein the at least one stream of plastic material comprises at least two streams of plastic material, including an interior stream and an outer covering stream which surrounds the interior stream, and wherein the step of terminating comprises terminating interior stream in said second portion of the mold.

2. The method of claim 1, wherein the outer covering stream comprises at least one inner layer and at least one outer layer, wherein the at least one inner layer is formed on a first side of the interior stream and the at least one outer layer is formed on a second opposing side of the interior stream.

3. The method of claim 1, comprising the further step of:

moving a throttle pin into a plastic flow channel of the mold.

4. The method of claim 1, comprising the further step of:

separating the first portion of the mold from the second portion of the mold.

5. A method for extruding plastic articles comprising the steps of:

injecting at least one stream of plastic material into a mold, said mold including a first portion and a second portion, said first portion of said mold being used for forming at least one article, and said second portion of said mold forming a sprue attached to the at least one article;

terminating the at least one stream of plastic material in said second portion of the mold;

separating the first portion of the mold from the second portion of the mold; and, separating the second portion of the mold from the source of the at least one stream of plastic material.

6. The method of claim 5, comprising the further step of:

moving an ejector member so as to eject a plastic sprue formed by the second portion of the mold.

7. The method of claim 1, wherein the steps of injecting and terminating are performed by an injection molding apparatus.

8. The method of claim 1, comprising the further step of:

removing a molded article from said mold, said molded article including portions corresponding to the first and second portions of the mold.

9. The method of claim 8, comprising the further step of:

separating the portion of the molded article corresponding to the first portion of the mold from the portion of the molded article corresponding to the second portion of the mold.

10. The method of claim 1, wherein said at least one stream of plastic material comprises at least one annular stream of plastic material.

11. A method for extruding plastic articles comprising the steps of:

injecting at least one stream of plastic material into a mold, said mold including a first portion and a second portion, said first portion of said mold being used for forming at least one article, and said second portion of said mold forming a sprue attached to the at least one article; and terminating the at least one stream of plastic material in said second portion of the mold, wherein said at least one stream of plastic material comprises at least one annular stream of plastic material, and wherein the step of terminating further comprises terminating the at least one annular stream of plastic material in said second portion of the mold so that an inner diameter of the at least one annular stream of plastic material is less than a diameter of a gate which injects the at least one annular stream of plastic material.

12. The method of claim 1, wherein the step of terminating further comprises terminating the interior stream in said second portion of the mold so that an inner diameter of the at least one annular stream of plastic material is less than a diameter of a gate which injects the at least two annular streams of plastic material.

13. A method for co-extruding plastic articles comprising the steps of:

injecting at least one annular stream of plastic material into a mold, said mold including a first portion and a second portion, said first portion of said mold being used for forming at least one article, and said second portion of said article forming a sprue attached to the at least one article; and terminating the at least one annular stream of plastic material in said second portion of the mold so that an inner diameter of the at least one annular stream is less than a diameter of a gate which injects the at least one annular stream of plastic material.

14. The method of claim 13, wherein the gate comprises a sprue gate disposed in the second portion of the mold.

15. The method of claim 13, wherein the at least one annular stream of plastic material comprises at least two annular streams of plastic material, including an interior stream and an outer covering stream which surrounds the interior stream.

16. The method of claim 15, wherein the step of terminating comprises terminating interior stream in said second portion of the mold.

17. The method of claim 13, wherein the inner diameter of the at least one annular stream of plastic material is approximately 50% of the diameter of the gate which injects the at least one annular stream of plastic material.

18. The method of claim 13, wherein the inner diameter of the at least one annular stream of plastic material is in a range of approximately 50–75% of the diameter of the gate which injects the at least one annular stream of plastic material.

19. The method of claim 13, wherein the inner diameter of the at least one annular stream of plastic material is in a range of approximately 25–50% of the diameter of the gate which injects the at least one annular stream of plastic material.

* * * * *